(12) United States Patent　　　　(10) Patent No.:　US 12,627,376 B2
Gabbay　　　　　　　　　　　　　　(45) Date of Patent:　May 12, 2026

(54) BAND-CONVERTED TRANSMISSION OF RF OVER FIBER

(71) Applicant: RFOPTIC LTD., Petah Tikva (IL)

(72) Inventor: David Gabbay, Marlboro, NJ (US)

(73) Assignee: RFOPTIC LTD., Petah Tikva (IL)

( * ) Notice: Subject to any disclaimer, the term of this patent is extended or adjusted under 35 U.S.C. 154(b) by 331 days.

(21) Appl. No.: 18/426,457

(22) Filed: Jan. 30, 2024

(65) Prior Publication Data

US 2025/0247151 A1　　　Jul. 31, 2025

(51) Int. Cl.
　　H04B 10/2575　　(2013.01)
　　H04B 10/548　　(2013.01)
　　H04B 10/61　　(2013.01)

(52) U.S. Cl.
　　CPC ....... H04B 10/2575 (2013.01); H04B 10/548 (2013.01); H04B 10/6164 (2013.01); *H04B 2210/006* (2013.01)

(58) Field of Classification Search
　　None
　　See application file for complete search history.

(56) References Cited

U.S. PATENT DOCUMENTS

| | | | |
|---|---|---|---|
| 4,584,658 | A | 4/1986 | Ottobre et al. |
| 4,665,372 | A | 5/1987 | Schwartz |
| 5,063,354 | A | 11/1991 | Lauper et al. |
| 5,332,975 | A | 7/1994 | Young et al. |
| 6,066,967 | A | 5/2000 | Cahill et al. |
| 6,597,208 | B1 | 7/2003 | Gabet et al. |
| 6,768,827 | B2 | 7/2004 | Yoo |
| 7,522,842 | B1 * | 4/2009 | McNicol ............ H04B 10/2916 |
| | | | 398/160 |
| 8,842,992 | B2 * | 9/2014 | Middleton ............. H04B 10/00 |
| | | | 398/208 |
| 8,909,057 | B2 | 12/2014 | Sun |
| 9,071,195 | B2 | 6/2015 | Gabbay |

(Continued)

OTHER PUBLICATIONS

Non Final Office Action, U.S. Appl. No. 18/637,493, dated Feb. 3, 2026.

(Continued)

*Primary Examiner* — Darren E Wolf

(74) *Attorney, Agent, or Firm* — Meitar Patents LTD.; Daniel Kligler

(57)　　　　　ABSTRACT

A system includes a downconverter, an optical transmitter, an optical receiver, and an upconverter. The downconverter includes an LO1 circuit and a mixer. The LO1 circuit generates an LO1 signal synchronized with an LO synchronization signal. The mixer receives RF signals in first frequency bands and downconverts them to second frequency bands by mixing the RF signals with the LO1 signal. The optical transmitter modulates the downconverted RF signals and the LO synchronization signal onto optical beams and transmits the modulated optical beams over a fiber. The optical receiver demodulates the modulated optical beams to reconstruct the downconverted RF signals and the LO synchronization signal. The upconverter includes an LO2 circuit and a mixer. The LO2 circuit generates an LO2 signal responsively to the reconstructed LO synchronization signal. The mixer mixes the reconstructed RF signals with the LO2 signal to reconstruct the RF signals in the first frequency bands.

18 Claims, 5 Drawing Sheets

(56)  References Cited

U.S. PATENT DOCUMENTS

| | | | | |
|---|---|---|---|---|
| 2004/0198451 A1* | 10/2004 | Varghese | H04B 1/40 | 455/562.1 |
| 2004/0208614 A1* | 10/2004 | Price | H04B 10/505 | 398/152 |
| 2008/0005213 A1 | 1/2008 | Holtzman | | |
| 2011/0097075 A1* | 4/2011 | Tanimura | H04B 10/07953 | 398/1 |
| 2011/0199127 A1 | 8/2011 | Turner | | |
| 2012/0141135 A1* | 6/2012 | Yang | H04J 14/06 | 398/140 |
| 2013/0259490 A1* | 10/2013 | Malouin | H04B 10/616 | 398/140 |
| 2018/0102849 A1* | 4/2018 | Morton | G02B 27/00 | |

OTHER PUBLICATIONS

Notice of References Cited, U.S. Appl. No. 18/637,493, dated Feb. 3, 2026.

* cited by examiner

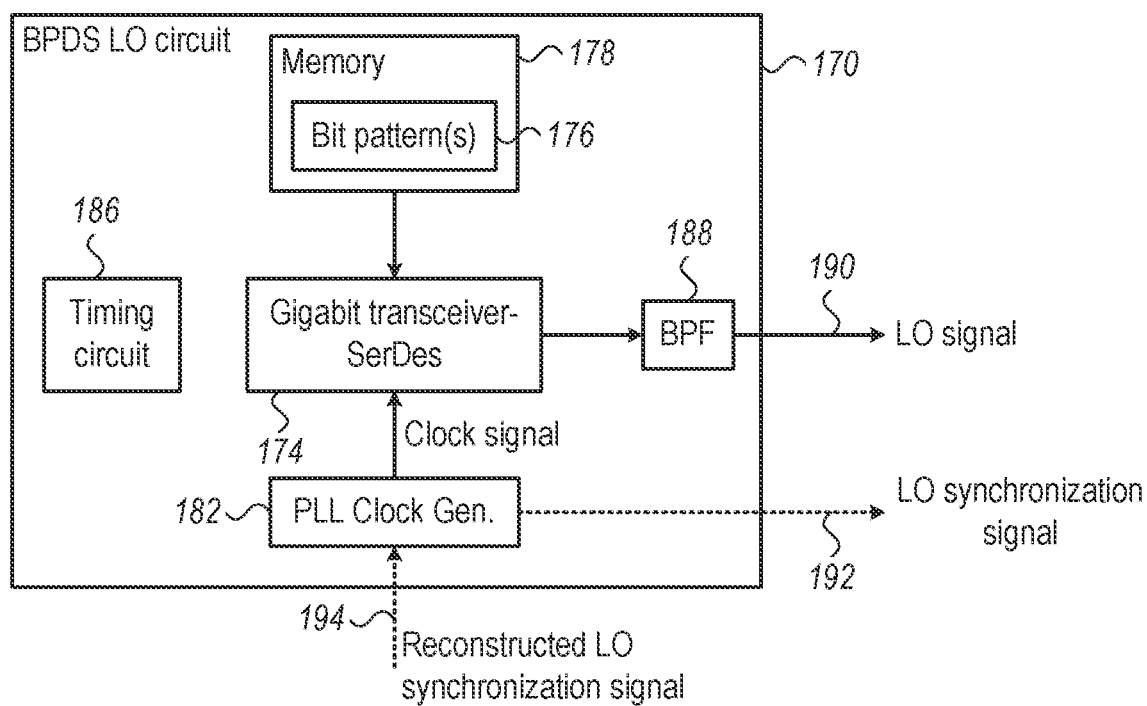
*FIG. 3*
*FIG. 4*
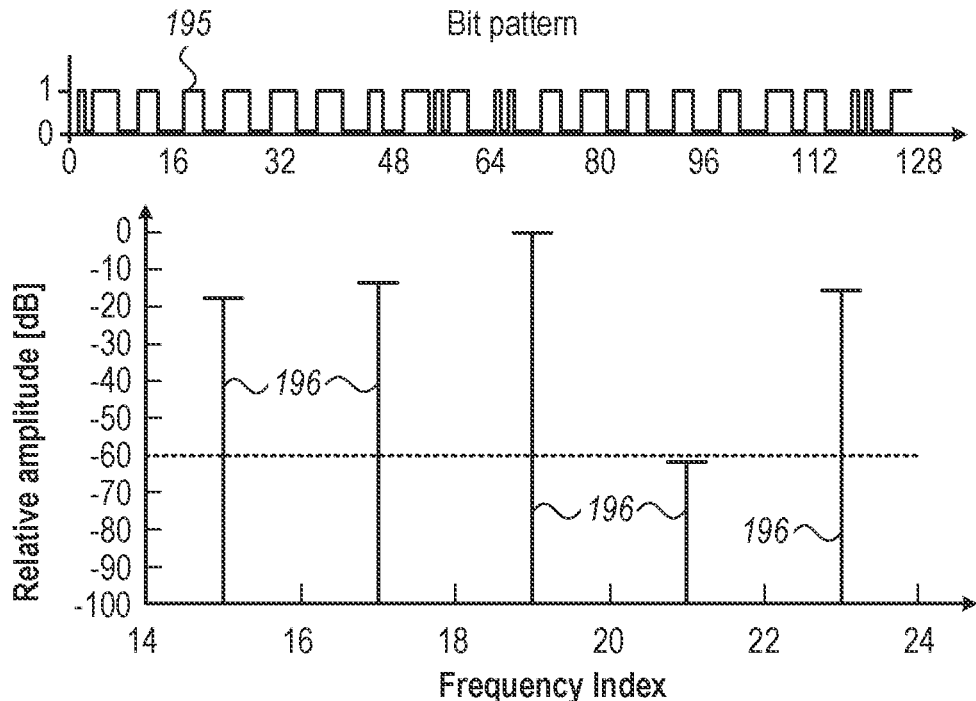

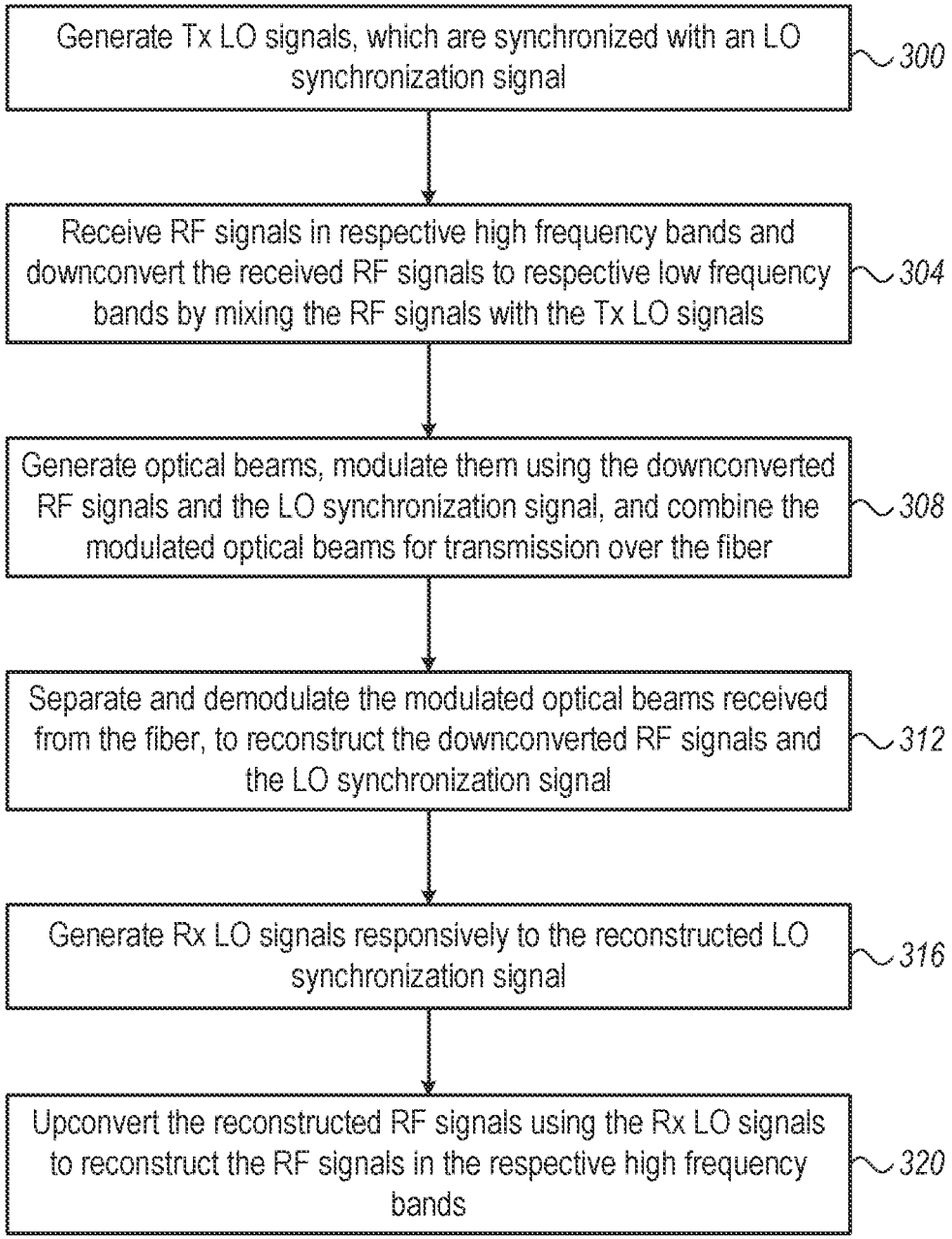

Generate Tx LO signals, which are synchronized with an LO synchronization signal ~ 300

Receive RF signals in respective high frequency bands and downconvert the received RF signals to respective low frequency bands by mixing the RF signals with the Tx LO signals ~ 304

Generate optical beams, modulate them using the downconverted RF signals and the LO synchronization signal, and combine the modulated optical beams for transmission over the fiber ~ 308

Separate and demodulate the modulated optical beams received from the fiber, to reconstruct the downconverted RF signals and the LO synchronization signal ~ 312

Generate Rx LO signals responsively to the reconstructed LO synchronization signal ~ 316

Upconvert the reconstructed RF signals using the Rx LO signals to reconstruct the RF signals in the respective high frequency bands ~ 320

FIG. 6

BAND-CONVERTED TRANSMISSION OF RF OVER FIBER

TECHNICAL FIELD

Embodiments described herein relate generally to RF transmission, and particularly to methods and systems for band-converted transmission of RF signals over fiber.

BACKGROUND

Modern communication technologies require the transmission of wideband high frequency Radio Frequency (RF) signals over distance. In various applications RF signals may be transmitted via optical fibers with very low transmission loss. Communication links supporting the transmission of RF signals over optical fibers are collectively referred to as "RF over Fiber" (RFoF) links.

SUMMARY

An embodiment that is described herein provides a system for communication, including a downconverter, an optical transmitter, an optical receiver, and an upconverter. The downconverter includes a first Local Oscillator (LO) circuit, and a mixer. The first LO circuit is configured to generate a first LO signal, which is synchronized with an LO synchronization signal. The mixer is coupled to receive one or more radiofrequency (RF) signals in respective first frequency bands and to downconvert the received RF signals to respective second frequency bands by mixing the RF signals with the first LO signal. The optical transmitter is configured to modulate the downconverted RF signals and the LO synchronization signal onto one or more optical beams and to transmit the one or more modulated optical beams over a fiber. The optical receiver is configured to receive and demodulate one or more modulated optical beams from the fiber to reconstruct the downconverted RF signals and the LO synchronization signal. The upconverter includes a second LO circuit and a mixer. The second LO circuit is configured to generate a second LO signal responsively to the reconstructed LO synchronization signal. The mixer is configured to mix the reconstructed RF signals with the second LO signal to reconstruct the one or more RF signals in the respective first frequency bands.

In some embodiments, the second LO circuit is configured to lock a phase of the second LO signal on a phase of the first LO signal using the LO synchronization signal. In other embodiments, the first LO signal includes one or more first LO signals associated respectively with the received RF signals, and the second LO signal includes one or more second LO signals associated respectively with the reconstructed RF signals. In yet other embodiments, for a given RF signal and corresponding reconstructed RF signal, the second LO circuit is configured to lock on a same LO frequency of the first LO signal, based on the reconstructed LO synchronization signal.

In an embodiment, the first LO circuit includes a first Direct Digital Synthesizer (DDS), configured to generate the first LO signals, and the second LO circuit includes a second DDS, configured to generate the second LO signals. In another embodiment, the first DDS and the second DDS are configured to generate the first LO signals and the second LO signals by cyclically serializing predefined bit patterns associated respectively with the RF signals. In yet another embodiment, the first DDS and the second DDS are configured to generate at least one of a frequency hopping first LO signal and a frequency hopping second LO signal, by switching, at specified instances, among different bit patterns.

In some embodiments, the first DDS is configured to apply phase modulation to an RF signal downconverted by a given LO signal, by shifting the bit pattern used for generating the given LO signal to corresponding points in the bit pattern, at specified instances. In other embodiments, based on the LO synchronization signal, the second LO circuit is configured to keep relative phase differences among the reconstructed RF signals so as to match respective relative phase differences among the received RF signals.

There is additionally provided, in accordance with an embodiment that is described herein, a method for communication, including generating a first LO signal, which is synchronized with an LO synchronization signal. One or more radiofrequency (RF) signals in respective first frequency bands are received, and the received RF signals are downconverted to respective second frequency bands by mixing the RF signals with the first LO signal. The downconverted RF signals and the LO synchronization signal are modulated onto one or more optical beams, and the one or more modulated optical beams are transmitted over a fiber. The one or more modulated optical beams are received from the fiber and demodulated to reconstruct the downconverted RF signals and the LO synchronization signal. A second LO signal is generated responsively to the reconstructed LO synchronization signal. The reconstructed RF signals are mixed with the second LO signal to reconstruct the one or more radiofrequency (RF) signals in the respective first frequency bands.

These and other embodiments will be more fully understood from the following detailed description of the embodiments thereof, taken together with the drawings in which:

BRIEF DESCRIPTION OF THE DRAWINGS

FIG. 3 is a block diagram that schematically illustrates a Local Oscillator (LO) circuit generating an LO signal by serializing a bit pattern, in accordance with an embodiment that is described herein;

FIG. 4 is a diagram that schematically illustrates a bit pattern and a spectral density resulting by cyclically serializing the bit pattern, in accordance with an embodiment that is described herein;

FIG. 6 is a flow chart that schematically illustrates a method for communication using RFoF, in accordance with an embodiment that is described herein.

DETAILED DESCRIPTION OF EMBODIMENTS

Overview

Figure 1:
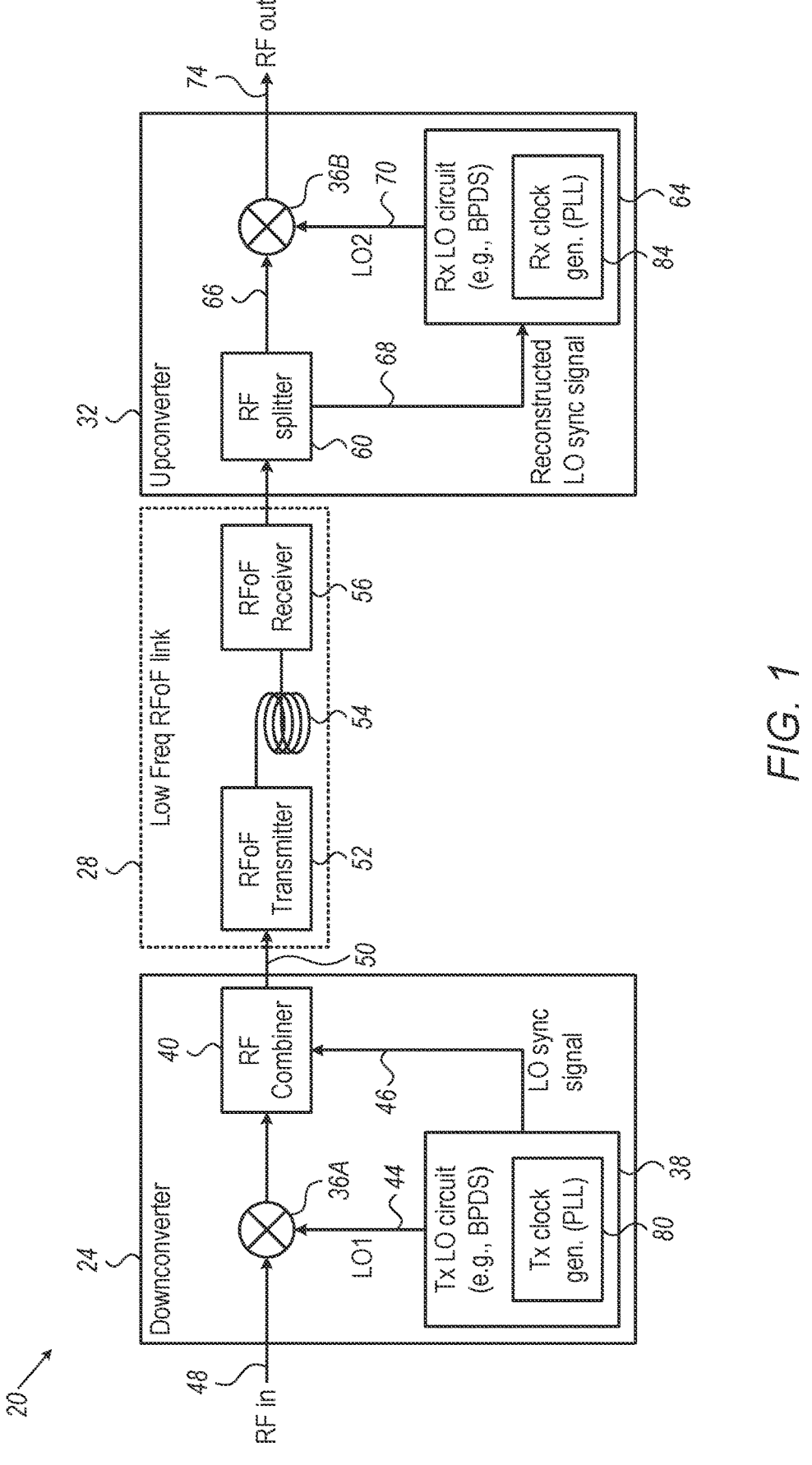
FIG. 1 is a block diagram that schematically illustrates a communication system transporting an RF signal occupying a high frequency band over an RFoF link that supports a low frequency band, in accordance with an embodiment that is described herein.

Embodiments that are described herein provide methods, systems, and circuits for transmitting RF signals occupying high frequency bands over RFoF links supporting low frequency bands, while synchronizing between local oscillators in the transmitter and receiver by transmitting a synchronization signal over the same optical fiber as the RF signals.

Various communication systems such as mobile systems and networks require the transmission of RF signals over long distances. In principle, RF signals could be transmitted wirelessly or over metal-based cables such as coaxial cables. Such transmission, however, would typically suffer high transmission loss, electromagnetic interference, and may require repeaters and amplifiers to compensate for the transmission losses over the long distances. Moreover, due to high cost and high loss of coaxial cables, the implementation of such systems is typically uneconomical, impractical or both.

As an alternative approach, long-distance communication of an RF signal may be carried out by transmitting the RF signal over an RFoF link. An RFoF link is typically built from a modulated light source coupled to an optical receiver via an optical fiber. The light source may comprise a modulated laser and the optical receiver may comprise a photodetector. RFoF based communication is economical, incurs very low transmission loss and is less sensitive to noise and electromagnetic interference compared to wireless and cable-based communication.

In general, a given optical fiber may be used for implementing a single RFoF link. Alternatively, a single fiber may be shared among multiple RFoF links.

Some communication systems require long-distance transmission of wideband high frequency RF signals such as microwave, millimeter (mm)-wave and even sub-mm-Wave signals. RFoF links, which support the transmission of high frequency band RF signals, are typically avoided, however, because they involve the usage of costly components.

In the description that follows, the terms "high frequency band" and "low frequency band" refer to respective frequency ranges above and below a frequency threshold that with current technology falls between 6 GHz and 10 GHz. High frequency RFoF solutions are typically based on cooled Distributed Feedback (DFB) lasers modulated directly or indirectly, whereas low frequency RFoF links are typically based on directly modulated uncooled lasers. An important advantage of the disclosed embodiments is that they allow the transmission of high frequency RF bands using low-cost low frequency RFoF links, which may reduce costs by a factor of 10 or even 20.

In the disclosed embodiments, RF signals occupying high frequency bands are downconverted to low frequency bands supported by the underlying RFoF links. The downconverted RF signals are upconverted back to the high frequency bands after traversing the RFoF link. In addition, synchronization between Local Oscillator (LO) signals used for down conversion at the transmitter and for up conversion at the receiver is achieved by transmitting an LO synchronization signal over the same optical fiber as the downconverted RF signals.

The disclosed RFoF based embodiments are applicable, for example, in the transmission of 5G/6G X-band and above mobile radio signals between a central location and remote base stations. In satellite communication, it is possible to achieve substantially wider signal bandwidths by using RFoF based solutions. Such a solution obviates the need for down conversion to L-band, which severely limits the bandwidth in ground stations for satellite communications. The disclosed embodiments are also applicable in various types of multi-channel applications including Direction Finding (DF), radar and other systems employing wideband beam forming antenna arrays.

Consider a system for communication, including a downconverter, an optical transmitter, an optical receiver and an upconverter. The downconverter includes a first Local Oscillator (LO) circuit generating a first LO signal, which is synchronized with an LO synchronization signal, and a mixer coupled to receive one or more radiofrequency (RF) signals in respective first frequency bands, and to downconvert the received RF signals to respective second frequency bands by mixing the RF signals with the first LO signal. The optical transmitter modulates the downconverted RF signals and the LO synchronization signal onto one or more optical beams and transmits the one or more modulated optical beams over a fiber. The optical receiver receives and demodulates the one or more modulated optical beams from the fiber to reconstruct the downconverted RF signals and the LO synchronization signal. The upconverter includes a second LO circuit generating a second LO signal responsively to the reconstructed LO synchronization signal, and a mixer mixing the reconstructed RF signals with the second LO signal to reconstruct the one or more radiofrequency (RF) signals in the respective first frequency bands.

In some embodiments, the second LO circuit locks a phase of the second LO signal on a phase of the first LO signal using the LO synchronization signal.

In some embodiments, the first LO signal includes one or more first LO signals associated respectively with the received RF signals, and the second LO signal includes one or more second LO signals associated respectively with the reconstructed RF signals. In such embodiments, for a given RF signal and corresponding reconstructed RF signal, the second LO circuit locks on the same LO frequency of the first LO signal, based on the reconstructed LO synchronization signal. The LO circuits may use any suitable type of an LO signal generating circuit for generating the LO signals. In an example embodiment, the first LO circuit includes a first Direct Digital Synthesizer (DDS) generating the first LO signals, and second LO circuit includes a second DDS generating the second LO signals. The first DDS and the second DDS generate the first LO signals and the second LO signals by cyclically serializing predefined bit patterns associated respectively with the RF signals.

In an embodiment, the first DDS and the second DDS generate at least one of a frequency hopping first LO signal and a frequency hopping second LO signal, by switching, at specified instances, among different bit patterns.

In some disclosed embodiments, the first DDS applies phase modulation to an RF signal downconverted by a given LO signal, by shifting the bit pattern used for generating the given LO signal to corresponding points in the bit pattern, at specified instances.

In some embodiments, e.g., when the RF signals are transmitted to or received from a phased array built from multiple antennas, the second LO circuit keeps relative phase differences among the reconstructed RF signals based on the LO synchronization signal, so as to match respective relative phase differences among the received RF signals.

In the disclosed techniques, one or more RF signals occupying high frequency bands are transported together with a synchronization signal over a single optical fiber. The RF signals are downconverted to low frequency bands supported by the underlying RFoF links and upconverted back to the high frequency bands after traversing the RFoF links. The synchronization signal is used for synchronization between LO signals used for frequency down conversion and up conversion. The disclosed embodiments provide reliable high throughput (wide bandwidth) multichannel communication (and other applications) over long distances at affordable costs.

System Description

FIG. 1 is a block diagram that schematically illustrates a communication system 20 transporting an RF signal occupying a high frequency band over an RFoF link that supports a low frequency band, in accordance with an embodiment that is described herein.

Communication system 20 comprises a downconverter 24 coupled to an RFoF link 28, which is further coupled to an upconverter 32. RFoF link 28 supports a low frequency band that is lower than the high frequency band of the RF signal. The downconverter comprises a mixer 36A, a transmitter (Tx) Local Oscillator (LO) circuit 38 and an RF combiner 40. Tx LO circuit 38 generates an LO signal 44 denoted "LO1", which is synchronized with an LO synchronization signal 46 generated locally, e.g., by Tx LO circuit 38 or by another circuit (not shown). Mixer 36A may comprise a regular mixer or a subharmonic mixer, as will be described with reference to FIG. 2 below.

Downconverter 24 receives an input RF signal 48 (denoted "RF in") occupying a high frequency band. Mixer 36A downconverts the received RF signal to the low frequency band supported by the RFoF link, by mixing the received RF signal with the LO1 signal. RF combiner 40 combines the downconverted RF signal and the LO1 synchronization signal to produce a combined RF signal 50 to be transmitted over RFoF link 28.

RFoF link 28 comprises an RFoF transmitter 52, an optical fiber 54 and an RFoF receiver 56. The low frequency band supported by the RFoF link fully contains the frequency band of the downconverted RF signal, but not the high frequency band of received RF signal 48. The RFoF transmitter modulates combined RF signal 50 onto an optical beam and transmits the modulated optical beam over the optical fiber. In some embodiments, the RFoF transmitter comprises a modulated light source such as a laser source (not shown) that generates an optical beam having a suitable wavelength and modulates (e.g., the amplitude) of the optical beam using the combined RF signal. In some embodiments, the light sources comprise low-cost uncooled direct modulation lasers.

RFoF receiver 56 receives the optical beam from the optical fiber and demodulates it to reconstruct the combined RF signal (including a reconstructed downconverted RF signal and a reconstructed LO synchronization signal). In an embodiment, the demodulation of the optical beam is carried out using a photodetector (not shown).

Upconverter 32 comprises an RF splitter 60, a mixer 36B and a receiver (Rx) LO circuit 64. The RF splitter separates between the frequency bands of the reconstructed RF signal 66 and reconstructed LO synchronization signal 68 carried in the reconstructed combined RF signal, e.g., using suitable filters. Rx LO circuit 64 generates, based on the reconstructed LO synchronization signal, an LO signal 70 denoted "LO2". Mixer 36B upconverts the reconstructed RF signal to the high frequency band of the received RF signal (48) to produce an output RF signal 74, by mixing the reconstructed RF signal with the LO2 signal. Mixer 36B may comprise a regular mixer or a subharmonic mixer, as will be described with reference to FIG. 2 below.

In some embodiments, Tx LO circuit 38 comprises a Tx clock generator 80 that generates a local clock signal from which the Tx LO circuit derives the LO1 signal. Tx clock generator 80 may comprise a Phase Locked Loop (PLL) circuit that locks on a clock signal generated locally, e.g., by a crystal oscillator. In some embodiments Rx LO circuit 64 comprises an Rx clock generator 84 that generates a local clock from which the Rx LO circuit derives the LO2 signal. Rx clock generator 84 may comprise a PLL circuit that locks on the phase of the LO1 signal based on reconstructed LO synchronization signal 68. In some embodiments the LO1 and LO2 signals are synchronized with one another both in phase and frequency.

In some embodiments, each of the Tx LO circuit and Rx LO circuit comprises a Direct Digital Synthesizer (DDS), such as, for example, a Bit Pattern Digital Signal Synthesis (BPDS) circuit. Various aspects of a BPDS circuit are described, for example, in a U.S. Pat. No. 9,071,195 (entitled "Method and system for signal synthesis"), whose disclosure is incorporated herein by reference.

In Tx LO circuit 38, the BPDS generates the LO1 signal (or a signal from which LO1 is derived), by cyclically serializing a predefined bit pattern using the clock signal generated by Tx clock generator 80. The actual bit pattern used determines the resulting LO frequency. In Rx LO circuit 84, the BPDS generates the LO2 signal (or a signal from which the OL2 signal is derived) by cyclically serializing the same bit pattern of the Tx LO circuit, using the clock signal generated by Rx clock generator 84. An example implementation of an LO circuit based on a BPDS circuit will be described in detail with reference to FIG. 3 below.

Communication system 20 in FIG. 1 is given by way of example, and other suitable communication systems can also be used. For example, although in FIG. 1 the RFoF link typically carries a single RF signal, in alternative embodiments, the received RF signal may comprise multiple RF signals (or channels) occupying respective separate non-overlapping high frequency bands. In such embodiments the multiple RF signals are downconverted and upconverted together using the respective LO1 and LO2 signals.

Communication Using RF Over Fiber

Figure 2:
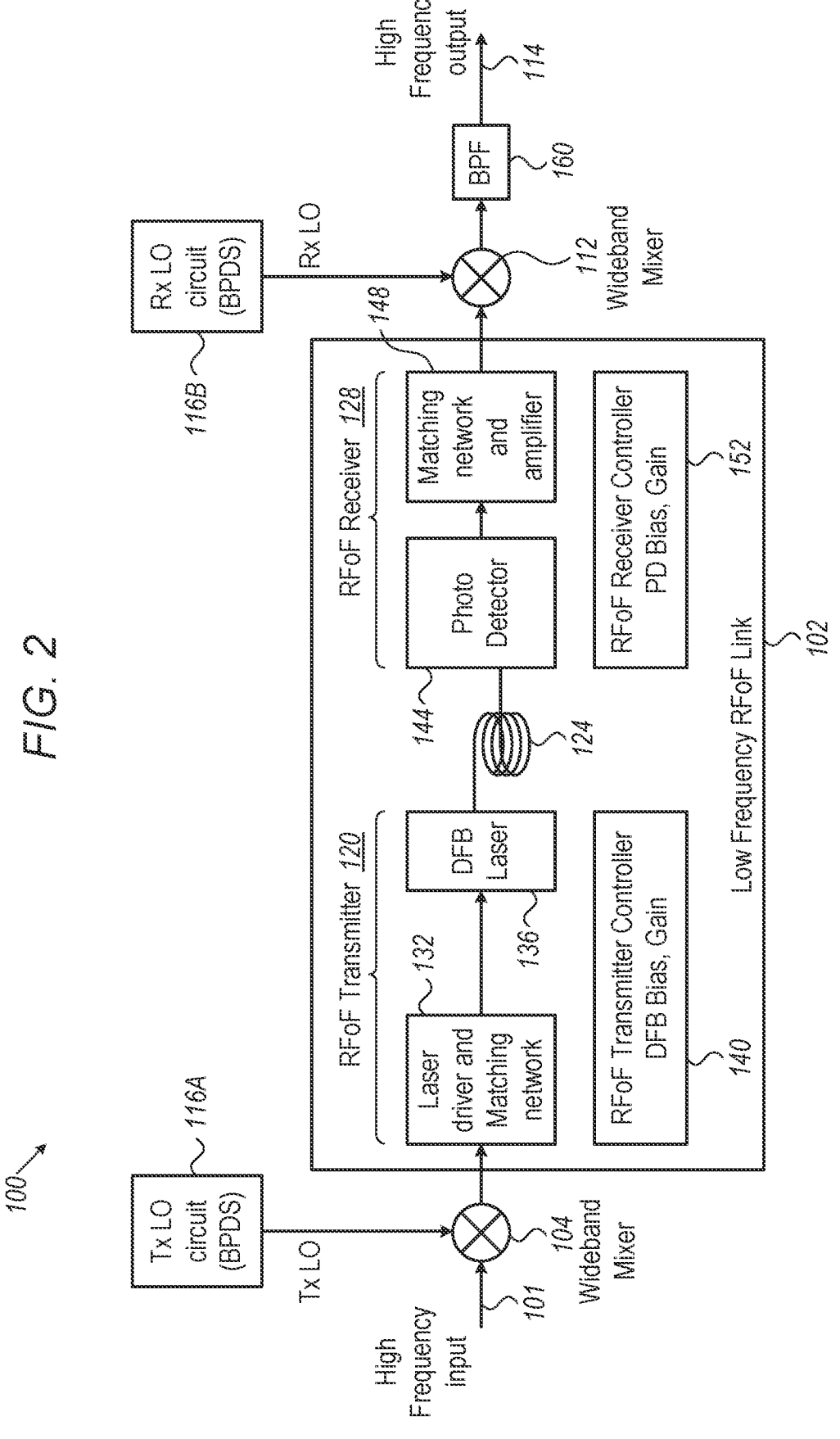
FIG. 2 is a block diagram that schematically illustrates an RFoF based link, in accordance with an embodiment that is described herein.

FIG. 2 is a block diagram that schematically illustrates an RFoF based link 100, in accordance with an embodiment that is described herein.

Link 100 comprises an RFoF link 102, which may be used in various RFoF based configurations, such as, for example, RFoF link 28 of communication system 20 of FIG. 1.

In the disclosed embodiments, an LO synchronization signal is transmitted over the same optical fiber as the RF signal(s). This sideband synchronization channel is omitted from FIG. 2 for the sake of clarity.

RFoF based Link 100 receives an RF signal 101 occupying a high frequency band, downconverts the input RF signal using a wideband input mixer 104 for transmission over RFoF link 102 supporting a low frequency band, and upconverts the transmitted signal back to the high frequency band using a wideband output mixer 112 so as to produce an output RF signal 114 reconstructing the input RF signal at the high frequency band. In the present example, the Tx LO signal used by input mixer 104 and the Rx LO signal used by output mixer 112 are generated using a Tx LO circuit 116A and a Rx LO circuit 116B, respectively. In this example, the Tx LO circuit and the Rx LO circuit comprise BPDS circuits.

Each input mixer 104 and each output mixer 112 has a signal input port, an LO input port, and an output port. Each of input mixers 104 and output mixer 112 may comprise a regular mixer or a subharmonic mixer. In embodiments using a regular mixer, and the LO signal generated by the BPDS matches the required LO frequency, the LO signal generated by the BPDS is provided directly to the mixer's LO input port. In case the frequency of the LO signal generated by the BPDS is lower than the required LO frequency, the signal generated by the BPDS is frequency multiplied and amplified as required (not shown). In embodiments that use a subharmonic mixer, the LO signal generated by the BPDS is lower than the required LO frequency, and is provided directly to the mixer's LO input port. In some embodiments the signal output by the BPDS is filtered to reduce unwanted spurious signals.

Input mixer 104 downconverts the high frequency band input RF signal for transmission over RFoF link 102. The RFoF link comprises an RFoF transmitter 120, an optical fiber 124 and an RFoF receiver 128. The RFoF transmitter comprises a laser driver and matching network 132, a modulated light source 136, and an RFoF transmitter controller 140. The RFoF receiver comprises a photodetector 144, a matching network and optionally an amplifier 148, and an RFoF receiver controller 152.

Laser driver and matching network 132 conditions and matches the downconverted RF signal output by the input mixer. The conditioned and matched RF signal is used for modulating an optical beam generated by a modulated light source 136 such as, for example, a Distributed Feedback (DFB) laser, for transmission over the optical fiber. In an embodiment, the laser modulates the optical beam using an amplitude modulation scheme and transmits the modulated optical beam to the RFoF receiver over the optical fiber. Transmitter controller 140 monitors and controls the operation of RFoF transmitter 120. For example, the transmitter controller controls the bias and optical power of the DFB laser, as well as gain control circuits of the matching network.

Photodetector 144 receives the modulated optical beam from the optical fiber and reconstructs from that optical beam the RF signal that was used for modulating the DFB laser in the RFoF transmitter. Matching network and amplifier 148 conditions and matches the reconstructed RF signal and amplifies it, e.g., using a low noise amplifier (not shown). Receiver controller 152 monitors and controls the operation of RFoF receiver 128. For example, the receiver controller controls the bias of the photo detector, as well as gain control circuits of the matching network.

Output mixer 112 upconverts the reconstructed RF signal back to the original high frequency band using the Rx LO signal generated by Rx LO circuit 116B. The RF signal output by output mixer 112 typically contains various frequency byproducts. A Band Pass Filter (BPF) 160 passes frequencies falling within the high frequency band of the input RF signal and suppresses other frequencies.

In some embodiments, the configuration of communication link 100 may be extended for transporting multiple RF signals. In such embodiments, the multiple RF signals are combined (in optical form) for transmission over a single optical fiber. A communication system of this sort will be described below with reference to FIG. 5.

Example BPDS Structure

FIG. 3 is a block diagram that schematically illustrates a Local Oscillator (LO) circuit 170 generating an LO signal by serializing a bit pattern, in accordance with an embodiment that is described herein.

LO circuit 170 of FIG. 3 may be used, for example, in implementing Tx LO circuit 38 and Rx LO circuit 64 of FIG. 1, Tx LO circuit 116A and Rx LO circuit 116B of FIG. 2, and Tx LO circuit 234A and Rx LO circuit 234B of FIG. 5 that will be described below. In the present example, LO circuit 170 is implemented using a BPDS circuit. LO circuit 170 is also referred to herein as BPDS 170.

BPDS 170 comprises a Gigabit transceiver in the form of a Serializer/De-serializer (SerDes) 174, a memory 178, a clock generator 182, a timing circuit 186 and a Band Pass Filter (BPF) 188. Memory 178 may comprise any suitable type of memory such as a Read Only Memory (ROM), Random Access Memory (RAM) or a Nonvolatile memory such as a Flash memory. Memory 178 stores a predefined bit sequence, also referred to as a "bit pattern" 176 (or stores multiple different bit patterns) having any suitable length, such as, for example, 128 bits. In general, different bit patterns correspond to different respective LO frequencies.

In generating the LO signal having a desired LO frequency, the timing circuit loads SerDes 174 with a corresponding bit pattern from memory 178. The SerDes serializes the loaded bit pattern using a clock signal generated by clock generator 182. For generating a continuous LO signal of the desired LO frequency, the SerDes cyclically serializes the bit pattern by outputting the bits of the loaded bit pattern sequentially using the clock signal. In addition, the serial output of the SerDes is connected to its serial input such that the SerDes continuously outputs the bit pattern in a cyclical repetition.

The frequency of the serializing clock signal determines the bit rate at the output of the SerDes. This bit rate may be set, for example, to 28.0 Gbps, or to any other suitable bit rate value. In an embodiment, the SerDes is configured to operate in a direct PHY coding mode so that the loaded bit pattern is serialized without being subjected to any coding or other modifications.

In some embodiments, timing circuit 186 loads different bit patterns to the SerDes as may be required for switching to different corresponding LO frequencies at specified instances. In an embodiment, the timing circuit may load to the SerDes a shifted version of the bit pattern to adjust the phase of the resulting LO signal. In some embodiments, the timing circuit shifts the bit pattern loaded to the SerDes to corresponding points in the bit pattern, at specified instances, e.g., to apply phase modulation to an RF signal downconverted by the LO signal. In another embodiment, the timing circuit loads into the SerDes different bit patterns at the beginning of specified intervals to cause frequency hopping among respective LO frequencies.

As depicted in FIG. 4, the spectral density of the signal output by the SerDes contains multiple spectral lines (196), including a dominant spectral line at the desired LO frequency. A BPF 188 filters out frequencies other than the desired LO frequency so as to produce an output LO signal 190.

In some embodiments, clock generator 182 comprises a PLL circuit. When used for down conversion, the PLL circuit generates an LO synchronization signal 192 to which LO signal 190 is synchronized. When used for up conversion, the PLL circuit locks on a reconstructed LO synchronization signal 194 (e.g., such as reconstructed LO synchronization signal 68 of FIG. 1).

In some embodiments LO circuit 170 is extended to generate multiple LO signals. In such embodiments, the LO circuit comprises multiple SerDes elements and corresponding BPFs, wherein the SerDes elements are loaded with different respective bit patterns. The clock signal generated by clock generator 182 is shared by the multiple SerDes elements so that the bits output by the multiple SerDes elements are synchronized with one another. Moreover, clocking all SerDes elements with the same clock signal keeps the relative phase differences among the LO signals (and therefore also the among RF signals) unmodified between the RF input and RF output.

Some commercial FPGA devices have built-in SerDes elements. In some embodiments, BPDS 170 may be implemented efficiently in a FPGA of this sort by utilizing the built-in SerDes elements.

The BPDS based LO circuit of FIG. 3 is given by way of example, and other suitable BPDS based or PLL based LO circuits can also be used.

FIG. 4 is a diagram that schematically illustrates a bit pattern 195 and a spectral density resulting by cyclically serializing the bit pattern, in accordance with an embodiment that is described herein.

The bit pattern of FIG. 4 may be used, for example, within BPDS circuit 170 of FIG. 3 above. In the present example, bit pattern 195 contains 128 bits. Alternatively, bit patterns of other lengths can also be used. In the present example, bit pattern 195 corresponds to a frequency index 19, which will result in an LO frequency of 19. Fstep, wherein Fstep is defined as the SerDes clock frequency divided by the number of bits in the bit pattern. For example, using a 32 GHz BPDS clock frequency, the resulting LO frequency is given by (19.32 GHZ/128)=4.75 GHZ. The spectral density in this case has discrete spectral lines spaced by Fstep=0.25 GHz intervals. The relative amplitudes of the spectral lines are given in decibels (dB). Since the amplitudes of the even indexed spectral components are null, the bandwidth of a filter (e.g., BPF 188) that selects the LO frequency (of an odd index) can be as wide as (5·Fstep)=1.25 GHZ.

It should be noted that the structure of the spectral density corresponding to a given bit pattern is independent of the SerDes clock frequency. Therefore, doubling (for example) the SerDes clock frequency has the effect of doubling both the Fstep and the LO signal output frequency.

The spectral line corresponding to the desired LO frequency of 4.75 GHz is dominant over the other spectral lines, and the spectral density has no spectral lines (or highly attenuated spectral lines) at all even frequencies, including in particular those at frequency indices of 18 and 20. Consequently, a low-complexity BPF (e.g., implementing BPF 188) is sufficient for suppressing all unwanted spectral lines (and other spectral content) excluding a narrow band around the desired LO frequency index 19.

In some embodiments, the same spectral density is achieved by replicating each bit in the bit pattern k times, and using a serialization bit rate that is k times higher than the original bit rate. In such embodiments, the phase resolution in applying phase modulation or phase shifts improves by a factor of k.

The bit pattern and spectral density in FIG. 4 are given by way of example, and other suitable bit patterns and spectral densities can also be used. For example, in alternative embodiments, other bit patterns for generating other LO frequencies can also be used. For example, another bit pattern may result in a spectral density having a dominant spectral line at a frequency index 21, which results in an LO frequency of 5.25 GHZ.

Multichannel RF Over Fiber Schemes

Figure 5:
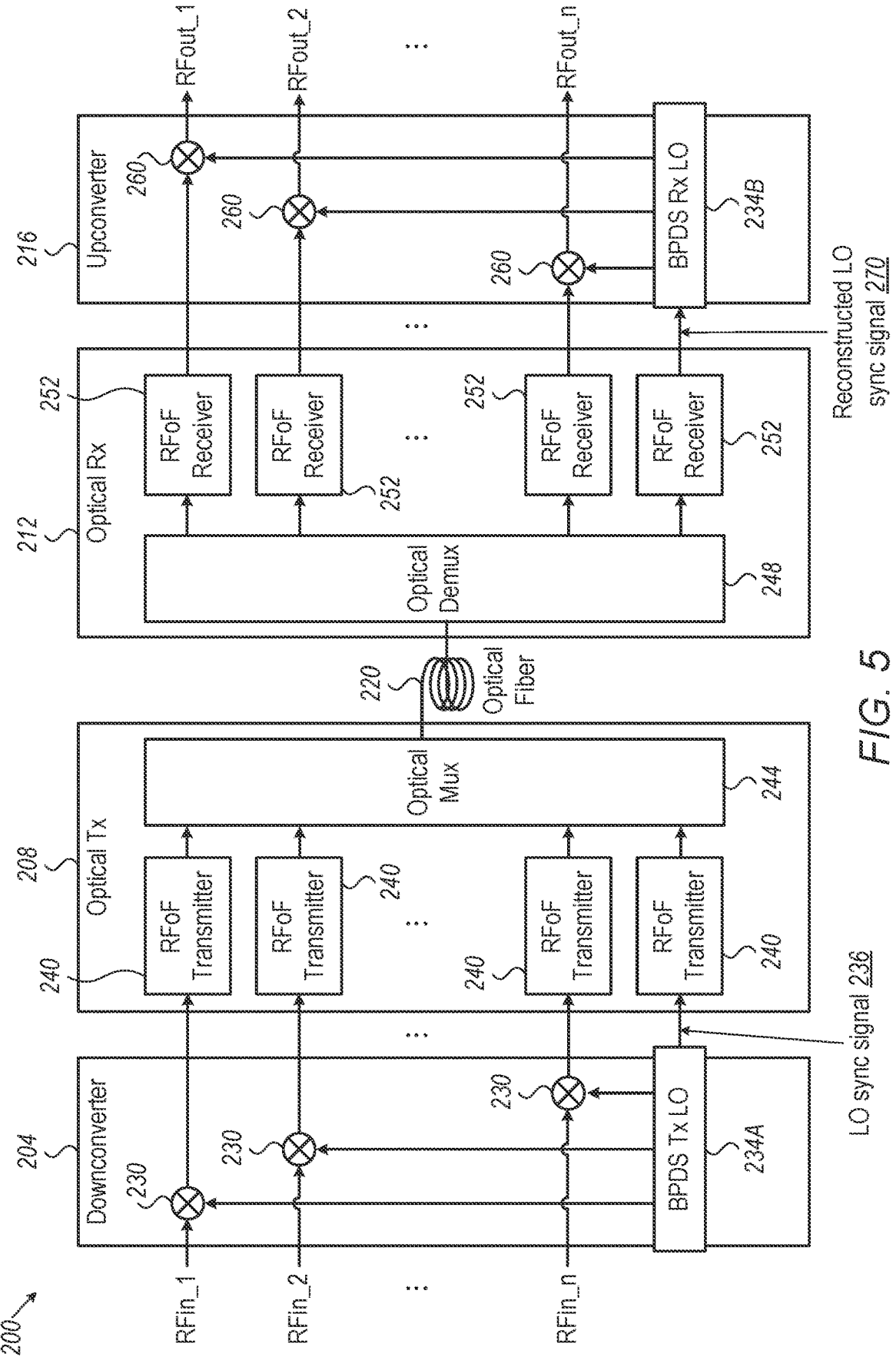
FIG. 5 is a block diagram that schematically illustrates a Wavelength Division Multiplexing (WDM) communication system transporting multiple high frequency band RF signals over a common optical fiber, using low frequency band RFoF links, in accordance with an embodiment that is described herein.

FIG. 5 is a block diagram that schematically illustrates a Wavelength Division Multiplexing (WDM) communication system 200 transporting multiple high frequency band RF signals over a common optical fiber, using low frequency band RFoF links, in accordance with an embodiment that is described herein.

Communication system 200 comprises a downconverter 204 followed by an optical transmitter 208, and an optical receiver 212 followed by an upconverter 216. An optical fiber 220 is coupled to the optical transmitter at one end and to the optical receiver at the other end.

In the present example, downconverter 204 receives a number 'n' of RF signals denoted "RFin_1" . . . "RFin_n" ('n' being a positive integer). Each of the received RF signals occupies a respective high frequency band, whereas the underlying RFoF links sharing optical fiber 220 support low frequency bands. In system 200, a path starting at the input of an RFoF transmitter and ends at the output of a corresponding RFoF receiver serves as a separate RFoF link.

Downconverter 204 comprises mixers 230, each of which is configured to downconvert an RF signal using an LO signal having a respective LO frequency. The downconverted RF signals are suitable for transmission optically over the RFoF links sharing optical fiber 220. A Tx LO circuit 234A generates Tx LO signals that are synchronized with an LO synchronization signal 236. In the present example, Tx LO circuit 234A is implemented using a BPDS (e.g., BPDS 170 of FIG. 3). RFoF transmitters 240 in optical transmitter 208 receive the downconverted RF signals and the LO synchronization signal. The RFoF transmitters comprise laser sources (not shown) generating optical beams at different respective wavelengths, and modulating the optical beams using the downconverted RF signals and the LO synchronization signal. An optical multiplexer 244 combines the modulated optical beams for transmission over the same optical fiber.

Optical demultiplexer 248 separates among the optical beams received from the optical fiber (based on their wavelengths), and RFoF receivers 252 reconstruct (i) the downconverted RF signals generated by downconverter 204 and (ii) the LO synchronization signal. In an embodiment, the RFoF receivers are implemented using photodetectors.

Upconverter 216 comprises mixers 260 upconverting the reconstructed RF signals to generate respective RF output signals denoted "RFout_1" . . . "RFout_n" in the respective high frequency bands of the input RF signals. Mixers 260 upconvert the reconstructed RF signals using respective Rx LO signals generated by an Rx LO circuit 234B. In the present example, LO circuit 234B is implemented using a BPDS (e.g., BPDS 170 of FIG. 3), which uses the reconstructed synchronization signal (270) (or a clock signal derived from the reconstructed synchronization signal) for bit pattern serialization. In some embodiments, for each RF signal, the Tx LO circuit and the Rx LO circuit serialize the same bit pattern. Moreover, based on the reconstructed synchronization signal, the frequencies and relative phases of the Rx LO signals are locked on the frequencies and relative phases of respective Tx LO signals.

Although the Tx LO circuit 234A and Rx LO circuit 234B in the system of FIG. 5 are implemented using BPDS circuits, this is not mandatory, and in alternative embodiments, other suitable types of LO synthesizers can also be used.

Communication system 200 may be used for high throughput communication of multiple RF channels. The high throughput is achievable by transmitting a large number of RF channels over the same optical fiber (e.g., 32 or 64 RF channels). A high throughput system of this sort may be used, for example, in a mobile communication network, e.g., for connecting between a central location and a massive Multiple Input, Multiple Output (MIMO) antenna array.

In some embodiments, the serialized bit patterns may be shifted by one or more bits relative to one another thereby creating relative prescribed phase shifts among the corresponding LO signals. The relative phase shifts may differ between any two LO signals and will be maintained for any two LO signals having a rational ratio between their respective frequencies. Using the bit replication technique described above, with a high value replication factor k, the prescribed relative phase shifts can be set with a desired accuracy.

In some applications, relative phase differences among the output RF signals should remain the same as the relative differences the input RF phase among signals. By maintaining the relative phase differences unmodified, the overall link provides superior timing accuracy, accurate phase tracking among channels, and timing stability. In an example embodiment, keeping the relative phase differences is required for communicating multiple RF signals to a phased or MIMO antenna array comprising multiple antennas. To this end, in some embodiments, based on the reconstructed LO synchronization signal, the Rx LO circuit is configured to keep relative phase differences among the reconstructed RF signals so as to match respective relative phase differences among the input RF signals.

In embodiments in which the LO signals are generated by a BPDS, maintaining the relative phase differences is guaranteed by serializing the bit patterns using a common BPDS clock signal, wherein based on the reconstructed LO synchronization signal, the Rx LO circuit locks on the same phase (and same LO frequency) of the LO signal generated by the corresponding Tx LO circuit.

In some embodiments, a transported RF signal hops over a sequence of high frequency bands in a respective sequence of time intervals. Such frequency hopping may be applied for covering several wideband sub-channels interleaved over time. Frequency hopping is also applicable in military applications such as communication, radar, and electronic warfare systems.

In frequency hopping, the LO signals (of the Tx LO circuit and the Rx LO circuit) associated with an RF signal in question are required to hop in frequency in accordance with the hopping sequence of the RF signal, so that for each interval in the sequence a different band of RF signals is downconverted to the low frequency band of the RFoF link. In alternative embodiments, the frequency band of the received RF signal is not modified over time, and frequency hopping is achieved in the output RF signal by generating a frequency hopping LO signal in the Rx LO circuit.

In some embodiments implementing frequency hopping, a BPDS generates a sequence of LO frequencies over a sequence of time intervals by loading to the SerDes respective bit patterns within these intervals. Reloading the SerDes with a different bit pattern results in fast and efficient hoping between corresponding LO frequencies.

In an embodiment of the communication system of FIG. 5, multiple RF channels are transmitted simultaneously and with phase synchronization over a single optical fiber, wherein the relative phase differences among the BPDS LO signals are adjusted to match over the RF channels. The signals from the multiple RF channels are combined in the optical domain by the WDM optical multiplexer. The synchronization in phase and timing among the RF channels simplifies the integration of the signals from such RF channels, to generate a combined optical signal. A combined signal of this sort is applicable, for example, in spatial beam forming such as used, for example, in Synthetic-Aperture Radar (SAR), cosmological observation and phased array.

Methods for RF Over Fiber Communication

FIG. 6 is a flow chart that schematically illustrates a method for communication using RFoF, in accordance with an embodiment that is described herein.

The method is described as executed in communication system 200 of FIG. 5.

The method begins with Tx LO circuit 234A generating Tx LO signals, which are synchronized with an LO synchronization signal, at a Tx LO signal generation step 300. The LO synchronization signal may be generated by the Tx LO circuit or by another circuit (not shown). At a down conversion step 304, downconverter 204 receives RF signals in respective high frequency bands and downconverts the received RF signals to respective low frequency bands by mixing the RF signals with the Tx LO signals (using mixers 230). The low frequency bands belong to an overall low frequency band supported by the RFoF link comprising optical fiber 220.

At an optical modulation step 308, optical transmitter 208 generates optical beams having different respective wavelengths, modulates the optical beams using the respective downconverted RF signals and the LO synchronization signal (using RFoF transmitters 240), combines the modulated beams (using optical multiplexer 244) and transmits the combined optical beams over optical fiber 220.

At a demodulation step 312, optical receiver 212, separates among the modulated optical beams received from the fiber (using optical demultiplexer 248) and demodulates the separated modulated optical beams (using RFoF receivers 252) to reconstruct the downconverted RF signals and the LO synchronization signal.

At a Rx LO signal generation step 316, Rx LO circuit generates Rx LO signals responsively to the reconstructed LO synchronization signal. At a reconstruction step 320, upconverter 216 upconverts the reconstructed RF signals using the Rx LO signals to reconstruct the RF signals in the respective high frequency bands. Following step 320 the method terminates.

The method of FIG. 6 is given by way of example, and other suitable methods can also be used. For example, although the method is described for transporting multiple RF signals, the method is similarly applicable for transporting a single RF signal (and a synchronization signal) over the optical fiber.

The configurations of communication system 20 of FIG. 1, RFoF based link 100 of FIG. 2, LO signal generation circuit (e.g., BPDS circuit) 170 of FIG. 3 and RFoF communication system 200 of FIG. 5, are example configurations, which are chosen purely for the sake of conceptual clarity. In alternative embodiments, other suitable communication system, RFoF based link, LO signal generation circuit, and RFoF communication system configurations can also be used.

Elements that are not necessary for understanding the principles of the present invention, such as various interfaces, addressing circuits, timing and sequencing circuits and debugging circuits, have been omitted from the figures for clarity.

Some elements of communication system 20, RFoF based link 100, BPDS circuit 170 and RFoF communication system 200, such as Tx LO circuits 38, 116A and 234A, Rx Lo circuits 64, 116B and 234B, RFoF transmitter 120 and RFoF receiver 128, and elements comprising BPDS circuit 170 may be implemented in hardware, e.g., in one or more Application-Specific Integrated Circuits (ASICs) or FPGAs. Additionally or alternatively, RFoF transmitter controller 140 and RFoF receiver controller 152 can be implemented using software, or using a combination of hardware and software elements.

In some embodiments, some of the functions of RFoF transmitter controller 140 and RFoF receiver controller 152, may be carried out by general-purpose processors, which are programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

The embodiments described above are given by way of example, and other suitable embodiments can also be used.

Although the embodiments described herein mainly address communication of high frequency RF bands over low frequency RFoF links, the methods and systems described herein can also be used in other applications, such as in beam forming, radar and direction finding, to name a few.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for communication, comprising:
a downconverter comprising:
 a first Local Oscillator (LO) circuit configured to generate a first LO signal, which is synchronized with an LO synchronization signal; and
 a mixer coupled to receive one or more radiofrequency (RF) signals in respective first frequency bands and to downconvert the received RF signals to respective second frequency bands by mixing the RF signals with the first LO signal;
an optical transmitter, which is configured to modulate the downconverted RF signals and the LO synchronization signal onto one or more optical beams and to transmit the one or more modulated optical beams over a fiber;
an optical receiver, which is configured to receive and demodulate the one or more modulated optical beams from the fiber to reconstruct the downconverted RF signals and the LO synchronization signal; and
an upconverter comprising:
 a second LO circuit, configured to generate a second LO signal responsively to the reconstructed LO synchronization signal; and
 a mixer configured to mix the reconstructed RF signals with the second LO signal to reconstruct the one or more radiofrequency (RF) signals in the respective first frequency bands.

2. The system according to claim 1, wherein the second LO circuit is configured to lock a phase of the second LO signal on a phase of the first LO signal using the LO synchronization signal.

3. The system according to claim 1, wherein the first LO signal comprises one or more first LO signals associated respectively with the received RF signals, and wherein the second LO signal comprises one or more second LO signals associated respectively with the reconstructed RF signals.

4. The system according to claim 3, wherein, for a given RF signal and corresponding reconstructed RF signal, the second LO circuit is configured to lock on a same LO frequency of the first LO signal, based on the reconstructed LO synchronization signal.

5. The system according to claim 3, wherein the first LO circuit comprises a first Direct Digital Synthesizer (DDS), configured to generate the first LO signals, and wherein the second LO circuit comprises a second DDS, configured to generate the second LO signals.

6. The system according to claim 5, wherein the first DDS and the second DDS are configured to generate the first LO signals and the second LO signals by cyclically serializing predefined bit patterns associated respectively with the RF signals.

7. The system according to claim 6, wherein the first DDS and the second DDS are configured to generate at least one of a frequency hopping first LO signal and a frequency hopping second LO signal, by switching, at specified instances, among different bit patterns.

8. The system according to claim 5, wherein the first DDS is configured to apply phase modulation to an RF signal downconverted by a given LO signal, by shifting the bit pattern used for generating the given LO signal to corresponding points in the bit pattern, at specified instances.

9. The system according to claim 1, wherein based on the LO synchronization signal, the second LO circuit is configured to keep relative phase differences among the reconstructed RF signals so as to match respective relative phase differences among the received RF signals.

10. A method for communication, comprising:
generating a first LO signal, which is synchronized with an LO synchronization signal;
receiving one or more radiofrequency (RF) signals in respective first frequency bands and downconverting the received RF signals to respective second frequency bands by mixing the RF signals with the first LO signal;
modulating the downconverted RF signals and the LO synchronization signal onto one or more optical beams and transmitting the one or more modulated optical beams over a fiber;
receiving and demodulating the one or more modulated optical beams from the fiber to reconstruct the downconverted RF signals and the LO synchronization signal;
generating a second LO signal responsively to the reconstructed LO synchronization signal; and
mixing the reconstructed RF signals with the second LO signal to reconstruct the one or more radiofrequency (RF) signals in the respective first frequency bands.

11. The method according to claim 10, and comprising locking a phase of the second LO signal on a phase of the first LO signal using the LO synchronization signal.

12. The method according to claim 10, wherein the first LO signal comprises one or more first LO signals associated respectively with the received RF signals, and wherein the second LO signal comprises one or more second LO signals associated respectively with the reconstructed RF signals.

13. The method according to claim 12, and comprising, for a given RF signal and corresponding reconstructed RF signal, locking on a same LO frequency of the first LO signal, based on the reconstructed LO synchronization signal.

14. The method according to claim 12, wherein generating the first LO signals comprises generating the first LO signals using a first Direct Digital Synthesizer (DDS), and wherein generating the second LO signals comprises generating the second LO signals using a second DDS.

15. The method according to claim 14, generating the first LO signals and the second LO signals comprises cyclically serializing predefined bit patterns associated respectively with the RF signals by the first DDS and the second DDS, respectively.

16. The method according to claim 15, and comprising generating at least one of a frequency hopping first LO signal and a frequency hopping second LO signal, by switching, at specified instances, among different bit patterns.

17. The method according to claim 14, and comprising applying phase modulation to an RF signal downconverted by a given LO signal, by shifting the bit pattern used for generating the given LO signal to corresponding points in the bit pattern, at specified instances.

18. The method according to claim 10, wherein based on the LO synchronization signal, keeping relative phase differences among the reconstructed RF signals so as to match respective relative phase differences among the received RF signals.

* * * * *